US012811151B2

(12) United States Patent
Cimpeanu et al.

(10) Patent No.: US 12,811,151 B2
(45) Date of Patent: Nov. 24, 2026

(54) USE OF AN AQUEOUS DISPERSION OF A POLYMER P AS A POLYMERIC BINDER IN ELECTRODE SLURRY COMPOSITION FOR ANODES OF SECONDARY BATTERIES

(71) Applicant: BASF SE, Ludwigshafen am Rhein (DE)

(72) Inventors: Carmen-Elena Cimpeanu, Ludwigshafen am Rhein (DE); Dirk Wulff, Ludwigshafen am Rhein (DE); Sarunas Turcinskas, Ludwigshafen am Rhein (DE); Christian Brand, Ludwigshafen am Rhein (DE); Faith Cetinel, Ludwigshafen am Rhein (DE); Claudia Wood, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 55 days.

(21) Appl. No.: 18/868,200

(22) PCT Filed: May 10, 2023

(86) PCT No.: PCT/EP2023/062364
§ 371 (c)(1),
(2) Date: Nov. 22, 2024

(87) PCT Pub. No.: WO2023/227369
PCT Pub. Date: Nov. 30, 2023

(65) Prior Publication Data

US 2025/0329739 A1 Oct. 23, 2025

(30) Foreign Application Priority Data

May 27, 2022 (EP) .................................... 22175723

(51) Int. Cl.

| | |
|---|---|
| ***H01M 4/62*** | (2006.01) |
| ***C08F 212/10*** | (2006.01) |
| ***C09D 5/24*** | (2006.01) |
| ***C09D 125/12*** | (2006.01) |
| ***H01M 4/02*** | (2006.01) |
| ***H01M 4/04*** | (2006.01) |
| ***H01M 4/139*** | (2010.01) |
| ***H01M 10/0525*** | (2010.01) |

(52) U.S. Cl.
CPC ........... *H01M 4/622* (2013.01); *C08F 212/10* (2013.01); *C09D 5/24* (2013.01); *C09D 125/12* (2013.01); *H01M 4/0404* (2013.01); *H01M 4/0433* (2013.01); *H01M 4/139* (2013.01); *C08F 2800/20* (2013.01); *H01M 2004/027* (2013.01); *H01M 10/0525* (2013.01)

(58) Field of Classification Search
CPC .. H01M 4/622; H01M 4/0404; H01M 4/0433; H01M 4/139; H01M 10/0525; H01M 2004/027; H01M 4/133; H01M 4/134; H01M 4/1395; H01M 4/1393; H01M 4/13; C08F 212/10; C08F 2800/20; C09D 5/24; C09D 125/12; Y02E 60/10
See application file for complete search history.

(56) References Cited

U.S. PATENT DOCUMENTS

| | | | | |
|---|---|---|---|---|
| 6,428,929 | B1 | 8/2002 | Koy et al. | |
| 12,098,222 | B2 | 9/2024 | Veling et al. | |
| 2013/0323588 | A1 * | 12/2013 | Kajiwara ............... | H01G 11/38 429/211 |

FOREIGN PATENT DOCUMENTS

| | | | |
|---|---|---|---|
| CN | 1427018 | A | 7/2003 |
| DE | 4419518 | A1 | 12/1995 |

(Continued)

OTHER PUBLICATIONS

European Search Report for EP Patent Application No. 22175723.0, Issued on Oct. 25, 2022, 3 pages.

(Continued)

*Primary Examiner* — Michael G Miller

(74) *Attorney, Agent, or Firm* — Faegre Drinker Biddle & Reath LLP

(57) ABSTRACT

The present invention relates to a method of using an aqueous dispersion of a polymer P obtainable by radically initiated emulsion polymerization, which comprises polymerizing (a) 40 to 75 parts by weight of at least one vinylaromatic compound, (b) 22.5 to 55 parts by weight of at least one conjugated aliphatic diene, (c) 0.5 to 10 parts by weight of at least one ethylenically unsaturated monomer containing acid groups (d1) 1 to 5 parts by weight of acrylamide and/or methacrylamide, (d2) 1 to 10 parts by weight of acrylonitrile and/or methacrylonitrile (e) 0 to 5 parts by weight of monoethylenically unsaturated monomer having at least one epoxy, hydroxyl, N-methylol or carbonyl group (f) 0 bis 20 parts by weight of at least one other monoethylenically unsaturated monomer, where the amounts of the monomers (a) to (f) add up to 100 parts by weight, at a polymerization temperature in the range of 70 to 95° C., as a polymeric binder in an electrode slurry composition for anodes of secondary batteries, aqueous polymer dispersions itself and a process for producing the aqueous dispersion by radically initiated emulsion polymerization, electrode slurry compositions for anodes comprising the polymer P, an anode of secondary batteries comprising the polymer P, a method of preparing this anode and the lithium ion secondary battery comprising the anode.

13 Claims, No Drawings

(56) References Cited

FOREIGN PATENT DOCUMENTS

| | | | | | |
|---|---|---|---|---|---|
| DE | 4435422 | A1 | | 4/1996 | |
| DE | 4435423 | A1 | | 4/1996 | |
| EP | 0040419 | B1 | | 7/1985 | |
| EP | 0567812 | A1 | | 11/1993 | |
| EP | 0614922 | A2 | | 9/1994 | |
| EP | 1058327 | A2 | | 12/2000 | |
| EP | 2869372 | A1 | | 5/2015 | |
| EP | 3007257 | A1 | | 4/2016 | |
| EP | 3748747 | A1 | | 12/2020 | |
| EP | 3748747 | B1 | * | 8/2023 | ............ H01M 4/622 |
| WO | 2004/091017 | A1 | | 10/2004 | |
| WO | 2020/114798 | A1 | | 6/2020 | |
| WO | 2020/249406 | A1 | | 12/2020 | |
| WO | 2021/078626 | A1 | | 4/2021 | |

OTHER PUBLICATIONS

International Preliminary Report on Patentability for PCT Patent Application PCT/EP2023/062364, Issued on Nov. 7, 2024, 7 pages, Dec. 12, 2024.

International Search Report and Written Opinion received for PCT Patent Application No. PCT/EP2023/062364, mailed on Jul. 27, 2023, 9 pages.

* cited by examiner

USE OF AN AQUEOUS DISPERSION OF A POLYMER P AS A POLYMERIC BINDER IN ELECTRODE SLURRY COMPOSITION FOR ANODES OF SECONDARY BATTERIES

CROSS-REFERENCE TO RELATED APPLICATIONS

This application is a National stage application (under 35 U.S.C. § 371) of PCT/EP2023/062364, filed May 10, 2023, which claims benefit of European Application No. 22175723.0, filed May 27, 2022, both of which are incorporated herein by reference in their entirety.

The use of an aqueous dispersion of a polymer P as a polymeric binder in electrode slurry composition for anodes of secondary batteries The invention relates to a method of using an aqueous polymer dispersion, comprising a vinylaromatic compound and a conjugated aliphatic diene in copolymerized form as a binder for the production of an electrode slurry composition for anodes. The invention also relates to the aqueous polymer dispersions and a process for producing the aqueous dispersion by radically free emulsion polymerization.

Lithium ion secondary batteries are modern devices for storing energy. Many application fields have been and are contemplated, from small devices such as mobile phones and laptop computers through car batteries and other batteries for e-mobility and energy storage. Various components of the batteries have a decisive role with respect to the performance of the battery such as the electrolyte, the electrode materials, and the separator. Particular attention has been paid to the electrode materials.

In general, a secondary cell using non-aqueous electrolyte solution comprises an anode, a cathode, and a nonaqueous electrolyte layer. In order to form a cathode, cathode slurry comprising a lithium-transition metal oxide as a cathode active material, a binder and solvent is prepared, the cathode slurry is coated on a collector made of a metal (preferably aluminum) foil, and then drying, pressing and molding steps are performed.

In order to form an anode, the same method as described above is performed, except that anode slurry comprising carbon or carbon composite or silicon or silicon composites or silicon oxide capable of lithium ion intercalation/deintercalation as an anode active material and an aqueous binder dispersion is used.

An important requirement for lithium ion secondary batteries is that they have good charging and discharging characteristics and therefore a good life characteristics with regard to the constantly alternating charging processes. The charging and discharging is done by intercalation and disintercalation of lithium causing volume expansion and shrinkage of the anode active material. Thus, the anode, which is a composite of several materials, is exposed to strong tensile forces, which easily lead to material breaks. Furthermore, there is a need for anodes that have a high proportion and thus also density of anode material, so that the binder content is usually very low. In this respect, binders are needed, which have a good adhesion. Although extensive research has been performed the solutions found so far still leave room for improvement.

Thus, EP 1 058 327 describes an anode consisting of a carrier substrate and an anode active material composition anode active material comprising a polymeric binder, a lithium-intercalating compound, a conductive agent and a partially saponified acrylate/vinyl acetate copolymer. The polymeric binder is a styrene/butadiene copolymer with acrylic acid and acrylamide as comonomers.

WO 2004/091017 describes the production of a slurry of anode active material using a special dispersant. The carbon is bound in the anode with a styrene/butadiene polymer.

EP 2 869 372 teaches a negative electrode slurry composition including a styrene-butadiene copolymer as a binder resin having a glass transition temperature of −30° C. to 60° C. and an acryl polymer latex, a water-soluble polymer, and a negative electrode material being a combination of a silicon-based active material and a carbon-based material. The styrene-butadiene copolymer latex consists of 62 parts of styrene, 33 parts of 1,3-butadiene, 4 parts of itaconic acid and 1 part of 2-hydroxyethyl acrylate. Such polymers show insufficient strength as binders in anodes.

EP 3 007 257 discloses is an elastic binder composition for secondary batteries, wherein butadiene/styrene latex particles having an average particle diameter in the range from 50 nm to 200 nm and acrylic copolymer latex particles having an average particle diameter from 300 nm to 700 nm are used as a binder in the electrode mixture. The polymers have a butadiene content of 60 wt.-% and have deficiencies in strength.

An object of the present invention is to provide a negative electrode slurry composition capable of suppressing swelling of a negative electrode and keeping a high adhesion to the anode active material and the current collector during repeated charging/discharging cycles. The binder polymer itself shall show a good stress/strain behavior.

The object is achieved according to the invention by the use of an aqueous dispersion of a polymer P obtainable by radically initiated emulsion polymerization, which comprises polymerizing

| | | |
|---|---|---|
| (a) | 40 to 75 parts by weight of | at least one vinylaromatic compound, |
| (b) | 22.5 to 55 parts by weight of | at least one conjugated aliphatic diene, |
| (c) | 0.5 to 10 parts by weight of | at least one ethylenically unsaturated monomer containing acid groups |
| (d1) | 1 to 5 parts by weight of | acrylamide and/or methacrylamide, |
| (d2) | 1 to 10 parts by weight of | acrylonitrile and/or methacrylonitrile |
| (e) | 0 to 5 parts by weight of | monoethylenically unsaturated monomer having at least one epoxy, hydroxyl, N-methylol or carbonyl group |
| (f) | 0 bis 20 parts by weight of | at least one other monoethylenically unsaturated monomer, |

where the amounts of the monomers (a) to (f) add up to 100 parts by weight, at a polymerization temperature in the range of 70 to 95° C., as a polymeric binder in an electrode slurry composition for anodes of secondary batteries.

The present invention also relates to the aqueous polymer dispersions obtainable by radically initiated aqueous emulsion polymerization, which comprises polymerizing

| | | |
|---|---|---|
| (a) | 40 to 75 parts by weight of | at least one vinylaromatic compound, |
| (b) | 22.5 to 55 parts by weight of | at least one conjugated aliphatic diene, |
| (c) | 0.5 to 10 parts by weight of | at least one ethylenically unsaturated monomer containing acid groups |
| (d1) | 1 to 5 parts by weight of | acrylamide and/or methacrylamide, |
| (d2) | 1 to 10 parts by weight of | acrylonitrile and/or methacrylonitrile |
| (e) | 0 to 5 parts by weight of | monoethylenically unsaturated monomer having at least one epoxy, hydroxyl, N-methylol or carbonyl group |

-continued

| | | |
|---|---|---|
| (f) | 0 bis 20 parts by weight of | at least one other monoethylenically unsaturated monomer, |

where the amounts of the monomers (a) to (f) add up to 100 parts by weight, at a polymerization temperature in the range of 70 to 95° C. and its process for producing the aqueous dispersion by radically initiated emulsion polymerization.

The present invention also relates to electrode slurry compositions for anodes comprising the polymer P, an anode of secondary batteries comprising the polymer P, a method of preparing this anode and the lithium ion secondary battery comprising the anode.

The aqueous dispersion of polymer P is hereinafter also referred to as polymer dispersion.

If an amount is reported in parts by weight hereinafter, this is based on 100 parts by weight of total monomers, unless specified otherwise.

Total monomer amount is the total amount of all monomers used in polymerization, which add up to 100 parts by weight.

If the solids content of the aqueous dispersion in wt % is mentioned, it is based on the weight of the aqueous dispersion.

In the following, compounds derived from acrylic acid and methacrylic acid are partly shortened by inserting the syllable "(meth)" in the compound derived from the acrylic acid.

The following ethylenically unsaturated monomers (a), (b), (c), (d1), (d2), (e) and (f) can be used to produce the aqueous polymer dispersions.

Examples of suitable vinylaromatic compounds (monomers of group (a)) include styrene, α-methylstyrene and/or vinyltoluene. From this group of monomers, preference is given to choosing styrene.

The total amount of monomers (a) is 40 to 75 parts by weight and preferably 45 to 70 parts by weight, in particular 47 to 60 parts by weight, based on 100 parts by weight of total monomers (a to f).

Examples of conjugated aliphatic diene (monomers of group (b)) which may be mentioned include 1,3-butadiene, isoprene, 1,3-pentadiene, dimethyl-1,3-butadiene and cyclopentadiene. From this group of monomers, preference is given to using 1,3-butadiene and/or isoprene.

The total amount of monomers (b) is 22.5 to 55 parts by weight, preferably 28 to 50 parts by weight and in particular 32 to 45 parts by weight, based on 100 parts by weight of total monomers.

Examples of monoethylenically unsaturated monomers comprising acid groups (monomers (c)) which may be mentioned include ethylenically unsaturated carboxylic acids, ethylenically unsaturated sulfonic acids and vinylphosphonic acid. The ethylenically unsaturated carboxylic acids used are preferably α,β-monoethylenically unsaturated mono- and dicarboxylic acids having 3 to 6 carbon atoms in the molecule. Examples of these are acrylic acid, methacrylic acid, itaconic acid, maleic acid, fumaric acid, crotonic acid, vinylacetic acid and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Preference is given to using acrylic acid, methacrylic acid and itaconic acid. The cited acids may be used either as a single component or as a combination thereof.

The monomers comprising acid groups may be used in the polymerization in the form of the free acids or else in a form partially or completely neutralized by suitable bases. Preference is given to using sodium hydroxide solution, potassium hydroxide solution or ammonia as neutralizing agent.

The total amount of monomers (c) is 0.5 to 10 parts by weight, preferably 1 to 8 parts by weight and in particular 2 to 5 parts by weight of one or more monomers comprising acid groups, based on 100 parts by weight of total monomers.

The total amount of monomers (d1) is 1 to 5 parts by weight, preferably 1 to 3 parts by weight and in particular 1 to 2 parts by weight of acrylamide and/or methacrylamide, preferable acylamide, based on 100 parts by weight of total monomers.

The total amount of monomers (d2) is 1 to 10 parts by weight, preferably 1 to 8 parts by weight and in particular 1 to 7 parts by weight of acrylonitrile and/or methacrylonitrile, preferably acrylonitrile, based on 100 parts by weight of total monomers.

Monomers (e) which typically increase the internal strength of the filmed polymer matrix normally have at least one epoxy, hydroxyl, N-methylol or carbonyl group. Preference is given to monoethylenically unsaturated compound having at least one N-methylol group, especially selected from the group comprising N-methylolacrylamide, and N-methylolmethacrylamide.

The total amount of monomers (e) is 0.1 to 5 parts by weight, preferably 0.2 to 4.5 parts by weight and in particular 0.4 to 4 parts by weight of one or more monomers comprising acid groups, based on 100 parts by weight of total monomers.

Other monomethylenically unsaturated monomers (f) are monomers which differ from the monomers of groups (a), (b), (c), (d) and (e). They are preferably selected from vinyl esters of saturated $C_1$ to $C_{18}$ carboxylic acids, preferably vinyl acetate, and esters of acrylic acid and methacrylic acid with monohydric $C_1$ to $C_{18}$ alcohols such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate, allyl esters of saturated carboxylic acids, vinyl ethers, vinyl ketones, dialkyl esters of ethylenically unsaturated carboxylic acids, N-vinylpyrrolidone, N-vinylpyrrolidine, N-vinylformamide, N,N-dialkylaminoalkylacrylamides, N,N-dialkylaminoalkylmethacrylamides, N,N-dialkylaminoalkyl acrylates, N,N-dialkylaminoalkyl methacrylates, vinyl chloride and vinylidene chloride (monomers of group (f)).

This group of monomers (f) is optionally used for modification of polymer P. The total amount of other monomers (f) may be up to 20 parts by weight based on 100 parts of total monomer. Based on 100 parts by weight of the total monomers, the proportion of one or more monomers of group (f) is 0 to 20 parts by weight, preferably 0.1 to 15 parts by weight and in particular 0.5 to 10 parts by weight.

Preference is given to monomers in which the vinylaromatic compound is styrene and/or methylstyrene, in particular styrene, and the conjugated aliphatic diene is 1,3-butadiene and/or isoprene, in particular 1,3 butadiene.

It is advantageous to polymerize

| | | |
|---|---|---|
| (a) | 45 to 68.9 parts by weight of | at least one vinylaromatic compound |
| (b) | 28 to 50 parts by weight | of at least one conjugated aliphatic diene |
| (c) | 1 to 8 parts by weight | of at least one ethylenically unsaturated carboxylic acids |
| (d1) | 1 to 3, preferably 1 to 2, | parts by weight of acrylamide |
| (d2) | 1 to 8, preferably 1 to 7, | parts by weight of acrylonitrile |
| (e) | 0.1 to 4 parts by weight | of monoethylenically unsaturated monomer having at least one N-methylol group and |
| (f) | 0 to 15 parts by weight | of at least one other monoethylenically unsaturated monomer, the amounts of the monomers (a) to (f) adding up to 100 parts by weight. |

Particular preference is given to polymerizing

| | | |
|---|---|---|
| (a) | 45 to 68.9 parts by weight | of at least of styrene |
| (b) | 28 to 50 parts by weight | of at least one 1,3-butadiene |
| (c) | 1 to 8 parts by weight | of at least one ethylenically unsaturated carboxylic acids, especially selected from the group consisting of acrylic acid, methacrylic acid and itaconic acid |
| (d1) | 1 to 3 parts by weight | of acrylamide |
| (d2) | 1 to 8 parts by weight | of acrylonitrile |
| (e) | 0.1 to 4 parts by weight | of monoethylenically unsaturated monomer selected from the group comprising N-methylolacrylamide, and N-methylolmethacrylamide and |
| (f) | 0.1 to 15 parts by weight | of at least one other monoethylenically unsaturated monomer, the amounts of the monomers (a) to (f) adding up to 100 parts by weight. |

The emulsion polymerization is carried out in an aqueous medium. This can for example be fully deionized water or else mixtures of water and a solvent miscible therewith such as methanol, ethanol, ethylene glycol, glycerol, sugar alcohols such as sorbitol or tetrahydrofuran. The total amount of aqueous medium is proportioned here such that the aqueous polymer dispersion obtained has a solids content of 20% to 70% by weight, frequently 30% to 65% by weight and often 40% to 60% by weight.

The process according to the invention uses free-radical initiators (also referred to as free-radical polymerization initiators), that is to say initiators which form free radicals under the reaction conditions. These may be peroxides or they may be azo compounds. Redox initiator systems are of course also suitable.

Peroxides used may in principle be inorganic peroxides and/or organic peroxides. Examples of suitable inorganic peroxides include hydrogen peroxide and peroxodisulfates, such as the mono- or dialkali metal or ammonium salts of peroxodisulfuric acid, for example the mono- and disodium, mono- and dipotassium, or ammonium salts thereof. Examples of suitable organic peroxides are alkyl hydroperoxides such as tert-butyl hydroperoxide, aryl hydroperoxides such as p-menthyl or cumene hydroperoxide, and dialkyl or diaryl peroxides such as di-tert-butyl, dibenzoyl or dicumene peroxide.

Azo compounds used are essentially 2,2'-azobis(isobutyronitrile), 2,2'-azobis(2-methylbutyronitrile), 2,2'-azobis(2,4-dimethylvaleronitrile), 2,2'-azobis(N,N'-dimethyleneisobutyroamidine) dihydrochloride and 2,2'-azobis(amidinopropyl) dihydrochloride (AIBA, corresponding to V-50 from Wako Chemicals).

Redox initiator systems are combined systems made up of at least one organic or inorganic reducing agent and at least one peroxide. Suitable oxidants for redox initiator systems are essentially the peroxides mentioned above. Corresponding reducing agents that may be used are sulfur compounds in a low oxidation state such as alkali metal sulfites, for example potassium and/or sodium sulfite, alkali metal hydrogen sulfites, for example potassium and/or sodium hydrogen sulfite, alkali metal metabisulfites, for example potassium and/or sodium metabisulfite, acetone bisulfite, formaldehyde sulfoxylates, for example potassium and/or sodium formaldehyde sulfoxylate, alkali metal salts, specifically potassium and/or sodium salts of aliphatic sulfinic acids and alkali metal hydrogen sulfides, for example potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone.

Preferred free-radical initiators are inorganic and organic peroxides, preferably ammonium or alkali metal salts of peroxosulfates or peroxodisulfates, and tert-butyl, p-menthyl and cumyl hydroperoxide, in particular selected from sodium and potassium peroxodisulfate, tert-butyl hydroperoxide and cumyl hydroperoxide. Particular preference is given here to using both at least one inorganic peroxide, preferably peroxodisulfate, in particular sodium peroxodisulfate, and/or one organic peroxide, preferably alkyl hydroperoxide, in particular t-butyl hydroperoxide.

The polymerization is generally carried out using 0.1 to 5 parts by weight of the free-radical initiator, preferably 0.5 to 4 parts by weight of the free-radical initiator, based on 100 parts by weight of total monomers.

Initiation of the polymerization reaction is understood to mean the start of the polymerization reaction of the monomers present in the polymerization vessel as a result of decomposition of the free-radical initiator.

Preferably the process of the invention is a monomer feed process. A monomer feed process means that the major amount, typically at least 90%, preferably at least 93%, of the monomers to be polymerized is supplied to the polymerization reaction under polymerization conditions.

It is possible here to include a portion of the monomers in an initial charge in the polymerization vessel before the beginning of the polymerization. According to this preferred variant, then, the polymerization may be initiated in an initial charge which contains 1 to 10 parts by weight of the total monomers and then monomers and emulsifier are metered continuously. More particularly it is possible to include up to 5% of the respective monomer in an initial charge and then to initiate the polymerization.

Polymerization conditions mean, generally, those amounts of radical initiator and those temperatures and pressures under which the radically initiated aqueous emulsion polymerization does not come to a standstill. The polymerization here is dependent primarily on the nature and amount of the radical initiator used. The relationships between temperature and decomposition rate are well known to the skilled person for the common polymerization initiators or can be ascertained in routine experiments.

According to a preferred embodiment, the monomers and the emulsifier are metered continuously. In other words, the monomer metering and also the emulsifier metering take place in a continuous mass flow, i.e., without interruption.

According to the invention, the polymerization is carried out in a temperature range of 70 to 95° C., preferably ≥75° C. to ≤90° C.

The metering of the conjugated aliphatic diene is generally carried out at elevated pressure. The metering of the conjugated aliphatic diene preferably takes place at a pressure in the range from 5 to 15 bar. The elevated pressure has the effect that for example the 1,3-butadiene which is gaseous at standard pressure and room temperature largely resides in the polymerization mixture.

The monomers are preferably metered in continuously, that is say without interruption. In this case, the monomers are preferably metered in with a metering rate which deviates from the average value of the respective overall feed by no more than 30%, preferably by no more than 20%. According to a preferred embodiment, the metering rate of the monomers (increase in the monomers) corresponds approximately to the polymerization rate of the monomers (decrease in the monomers).

In order to promote the emulsification of the monomers in the aqueous medium, it is possible to use the typically used protective colloids and/or emulsifiers. An extensive description of suitable protective colloids can be found in Houben-Weyl, Methoden der organischen Chemie [Methods of Organic Chemistry], volume XIV/1, Makromolekulare Stoffe [Macromolecular Materials], Georg-Thieme-Verlag, Stuttgart, 1961, pages 411 to 420.

Useful emulsifiers include interface-active substances having a number-average molecular weight of typically below 2000 g/mol or preferably below 1500 g/mol, whereas the number-average molecular weight of the protective colloids is above 2000 g/mol, for example from 2000 to 100 000 g/mol, in particular from 5000 to 50 000 g/mol. Suitable emulsifiers are described in WO 2020/114798 on pages 9, line 40 to page 10, line 22.

If emulsifiers and/or protective colloids are additionally used as auxiliaries for dispersing the monomers, the amounts used thereof are for example 0.1 to 5 parts by weight based on 100 parts by weight of monomers.

Commonly used emulsifiers are, for example, ethoxylated mono-, di- and trialkylphenols (EO level: 3 to 50, alkyl radical: $C_4$ to $C_{12}$), ethoxylated fatty alcohols (EO level: 3 to 50; alkyl radical: $C_8$ to $C_{36}$) and alkali metal and ammonium salts of alkyl sulfates (alkyl radical: $C_8$ to $C_{12}$), of sulfuric monoesters of ethoxylated alkanols (EO level: 3 to 30, alkyl radical: $C_{12}$ to $C_{18}$) and ethoxylated alkylphenols (EO level: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers can be found in Houben-Weyl, Methoden der organischen Chemie [Methods of Organic Chemistry], vol. XIV/1, Makromolekulare Stoffe [Macromolecular substances], pages 192-208, Georg-Thieme-Verlag, Stuttgart, 1961.

Further suitable surface-active substances have been found to be compounds of the general formula I (I)

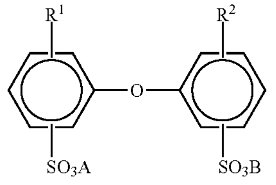

in which $R^1$ and $R^2$ are $C_4$- to $C_{24}$-alkyl and one of the $R^1$ and $R^2$ radicals may also be hydrogen, and A and B may be alkali metal ions and/or ammonium ions. In the general formula I, $R^1$ and $R^2$ are preferably linear or branched alkyl radicals having 6 to 18 carbon atoms, especially having 6, 12 or 16 carbon atoms, or hydrogen atoms, where $R^1$ and $R^2$ are not both simultaneously hydrogen atoms. A and B are preferably sodium, potassium or ammonium ions, with sodium ions being particularly preferred. Particularly advantageous compounds I are those in which A and B are sodium ions, $R^1$ is a branched alkyl radical having 12 carbon atoms and $R^2$ is a hydrogen atom or $R^1$. Technical grade mixtures comprising a proportion of 50% to 90% by weight of the monoalkylated product, for example Dowfax® 2A1 (brand of Dow Chemical Company), are frequently used. The compounds I are common knowledge, for example from U.S. Pat. No. US-A 4 269 749, and are commercially available.

If dispersing aids are included in the preparation of the aqueous dispersion of the polymer P, the total amount of dispersing aids used, especially emulsifiers, is 0.1% to 5% by weight, preferably 1% to 3% by weight, based in each case on the total amount of the monomers. In an advantageous embodiment, emulsifiers are used as the sole dispersing aids.

If dispersing aids are included in the preparation of the aqueous dispersion of the polymer P, it is optionally possible to initially charge a portion or the entirety of the dispersing aids as a constituent of the aqueous medium comprising the polymer A. Alternatively, it is possible to meter in the entirety or any remaining residual amount of dispersing aids together with the monomers P during the polymerization reaction. The manner in which the entirety or any remaining residual amount of dispersing aids is metered into the aqueous polymerization medium here can be discontinuous in one or more portions, or continuous with constant or varying flow rates.

According to one embodiment of the invention, the polymerization is conducted in the presence of a degraded starch. Preference is given in the emulsion copolymerization to using 15 to 100 parts by weight of a degraded starch per 100 parts by weight of the monomers.

Degraded starches are generally known and described, for example, in WO2020/249406 on pages 15 to page 16, line 2.

Preference is given to degraded native starches, in particular native starches degraded to maltodextrin.

Preference is given to degraded starches with an intrinsic viscosity ηi of ≤0.07 dl/g or preferably ≤0.05 dl/g. The intrinsic viscosity $\eta_i$ of the degraded starches is preferably in the range of 0.02 to 0.06 dl/g. The intrinsic viscosity $\eta_i$ is determined according to DIN EN1628 at a temperature of 23° C.

According to a further preferred embodiment, no degraded starch is present during polymerization.

As well as the seed-free mode of preparation, the polymer particle size can also be adjusted by effecting the emulsion polymerization for preparation of the polymers P by the seed latex process or in the presence of a seed latex produced in situ. Such processes are known to those skilled in the art and can be found in the prior art (see e.g. EP-B 40 419, EP-A 567 812, EP-A 614 922 and "Encyclopedia of Polymer Science and Technology", vol. 5, page 847, John Wiley & Sons Inc., New York, 1966).

According to one preferred variant of the emulsion polymerization process, a seed latex is employed.

By a seed latex, the skilled person usually understands a polymer dispersion whose seed particles act as core of particle formation in the polymerization process.

According to a preferred process variant, an aqueous polymer dispersion with a weight-average particle size Dw50 in the range of 20 to 60 nm and a ratio Dw50/Dn50≤2 is used as seed latex.

In the following, the weight-average particle diameter is understood to mean the weight-average Dw50 value determined by the method of the analytical ultracentrifuge, and the number-average Dn50 value determined by the same method is understood to mean the mean particle diameter (see S. E. Harding et al., Analytical Ultracentrifugation in Biochemistry 5 and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). A narrow particle size distribution is to be understood in the context of this description if the ratio of the weight-average particle diameter Dw50 determined by the method of the analytical ultracentrifuge and number-average particle diameter Dn50 [Dw50/Dn50] is less than or equal to 2.0, preferably less than or equal to 1.5 and particularly preferably less than or equal to 1.2 or less than or equal to 1.1.

The production of a seed latex is known to those skilled in the art and is usually carried out in the presence of a large amount of emulsifier, which results in small particle sizes and a narrow particle size distribution. It is generally observed that polymerizations that are carried out in the presence of such an exogenous seed latex—as opposed to an in-situ seed latex—are characterized by uniform particle growth. The seed latex, as the name suggests, is usually used in the form of an aqueous dispersion.

The seed latex is preferably a styrene polymer and/or methyl methacrylate polymer having a glass transition temperature ≥50° C., ≥60° C., ≥70° C., ≥80° C. or ≥90° C., measured according to DIN EN ISO 11357-2 (2013-09).

Preferably, 0.01 to 3 parts by weight, in particular 0.02 to 1 parts by weight of seed latex (calculated as a solid) based on total monomers are used.

Preferably, the polymerization is initiated in an initial charge in the polymerization vessel containing up to 3 parts by weight of aqueous dispersion of a polystyrene seed latex based on 100 parts by weight of total monomers and then continuously dosed monomers and emulsifiers.

In order to modify the properties of the polymers, it is possible to conduct the emulsion polymerization optionally in the presence of at least one free-radical chain transfer agent, particular preference being given to sulfur-, nitrogen- and/or phosphorus-containing free-radical chain transfer agents having a solubility of ≥5 g/100 g of water in deionized water at 20° C. and 1 atm. These are typically used to reduce or to control the molecular weight of the polymers obtainable by a free-radical aqueous emulsion polymerization.

Sulfur-containing free-radical chain transfer agents used are, for example, alkyl mercaptans such as n-hexyl mercaptan, n-octyl mercaptan, t-octyl mercaptan, n-dodecyl mercaptan, t-dodecyl mercaptan and n-stearyl mercaptan, mercaptoalkanols such as 2-mercaptoethanol, 2-mercaptopropanol or 3-mercaptopropanol, alkylester of thioglycolic acid such as 2-ethylhexyl thioglycolate, alkylester of 3-mercaptopropionic acid such as isooctyl mercaptopropionate, alkali metal hydrogensulfites such as sodium hydrogensulfite or potassium hydrogensulfite, and thiosulfuric acid and the alkali metal salts thereof or 3-mercapto-2-aminopropanoic acid (cysteine), nitrogen-containing free-radical chain transfer agents used are, for example, hydroxylamine (ammonium) compounds such as hydroxylammonium sulfate, and phosphorus-containing free-radical chain transfer agents used are, for example, phosphorous acid, hypophosphorous acid, metaphosphorous acid, orthophosphoric acid, pyrophosphoric acid or polyphosphoric acid and the alkali metal salts thereof, especially the sodium or potassium salts thereof, advantageously sodium hypophosphite or sodium dihydrogenphosphate, and thiuram-based compounds such as terpinolen.

Especially advantageously, the free-radical chain transfer agent is selected from hypophosphorous acid and the alkali metal salts thereof, especially sodium hypophosphite, alkali metal hydrogensulfites, especially sodium hydrogensulfite, hydroxylammonium sulfate and/or 2-mercaptoethanol, t-dodecyl mercaptan and terpinolen.

According a preferred embodiment the free-radical chain transfer agent used in the polymerization is in an amount ≤1 parts by weight, preferably in the range of from 0.1 to 1, preferably in the range of from 0.2 to 0.8 parts by weight, based on 100 parts by weight of total monomers used in the polymerization.

To complete the polymerization reaction, it is sufficient in most cases to stir the reaction mixture after all monomers have been added for example for further 0.2 to 3 hours at the polymerization temperature. A conversion of around 95% has typically been achieved at this point in time.

In order to increase the conversion yet further, it is possible for example to add further free-radical initiator from the group of the abovementioned initiators to the reaction mixture or to prolong the addition and what is known as a "postpolymerization", that is to say a polymerization to achieve conversions of >95% up to 99%.

Such a post-polymerization can be conducted at the same, lower or else at higher temperature as/than the main polymerization. For example, 0.1 to 1.5 parts by weight, based on 100 parts by weight of the monomers used in the polymerization, of inorganic peroxide, preferably sodium peroxodisulfate, are metered in in this phase as initiator and the polymerization temperature is set to a temperature in the range from 70 to 95° C.

The pH can be for example 1 to 5 during the polymerization. After the end of the polymerization at a conversion of >95%, the pH is for example adjusted to a value between 6 and 7.

Chemical deodorization can in addition also be performed. If traces of residual monomers are still to be removed, this can also be done chemically by the action of redox initiator systems, as specified in DE-A 44 35 423, DE-A 44 19 518 and in DE-A 44 35 422. Suitable oxidizing agents are in particular the abovementioned organic and/or inorganic peroxides. Suitable reducing agents preferably include sodium disulfite, sodium hydrogen sulfite, sodium dithionite, sodium hydroxymethanesulfinate, formamidinesulfinic acid, acetone bisulfite (=addition product of sodium hydrogensulfite onto acetone), ascorbic acid or reducing sugar compounds, or water-soluble mercaptans such as mercaptoethanol.

The treatment with the redox initiator system is conducted in a temperature range from 60 to 100° C., preferably at 70 to 90° C. The redox partners can each independently be added to the dispersion in their entirety, in portions or continuously over a period of 10 minutes to 4 hours. To improve the post-polymerization action of the redox initiator systems, soluble salts of metals of varying valency, such as iron, copper, or vanadium salts, may be added to the dispersion. Complexing agents which keep the metal salts in solution under the reaction conditions are also frequently added.

Following the polymerization reaction (main polymerization+post-polymerization) and optional chemical deodorization, it may be necessary to render the aqueous polymer dispersions largely free from odor carriers such as residual monomers and other volatile organic constituents, which is also referred to as physical deodorization. This can be achieved in a manner known per se by physical means by distillative removal (in particular via steam distillation) or by stripping with an inert gas.

According to the invention the aqueous dispersion of a polymer P is used as a polymeric binder in an electrode slurry composition for anodes of secondary batteries.

Preferred is a polymer P which has a breaking stress of at least 8 $N/mm^2$, preferably in the range of from 8 to 20 $N/mm^2$ and the strain is at least 150%.

The present invention also relates to an electrode slurry composition for anodes comprising the polymer P, anode active material, conductive material, co-binder and dispersing medium.

The proportion of the polymer P in the electrode slurry composition for anodes is in the range from 0.5 to 20% wt, preferably from 0.7 to 10 wt % based on the electrode slurry composition for anodes both based on the solids content.

The anode active material may be any material capable of intercalating lithium.

Preferred anode active materials are silicon, silicon oxide, graphite, silicon carbon composite, tin, lithium, aluminum, lithium titanium oxide and lithium silicon. Particularly preferred are graphite for example artificial graphite, natural graphite and fiber graphite and silicon, silicon oxide and silicon-carbon composites.

The amount of the anode active material in the electrode slurry composition for anodes is in the range from 50 to 98% wt, preferably from 75 to 98 wt % based on the electrode slurry composition for anodes both based on the solids content.

The conductive material may be anyone selected from the group consisting of carbon black, acetylene black, carbon fiber, multi-walled carbon nanotubes, single-walled carbon nanotubes, Ketjen black, and a mixture thereof.

The amount of the conductive material in the electrode slurry composition for anodes is in the range from 0.01 wt % to 20% wt, preferably from 0.02 wt % to 10 wt % based on the electrode slurry composition for anodes both based on the solids content.

Co-binders are water-soluble polymers which may be any one selected from the group consisting of methyl cellulose, carboxymethyl cellulose, hydroxyethyl cellulose, hydroxypropyl cellulose, ethylhydroxyethyl cellulose, hydroxyalkyl methyl cellulose, polyvinyl alcohol, polyvinylpyrrolidone, polyvinylpyridine, polyacrylonitrile, polyethylene oxide, and a mixture thereof. Preferred co-binders are selected from the group consisting of methyl cellulose, carboxymethyl cellulose, hydroxyethyl cellulose, hydroxypropyl cellulose, ethylhydroxyethyl cellulose, and hydroxyalkyl methyl cellulose.

The amount of the co-binder is in the ranges from 0.5 wt % to 20 wt %, preferably from 0.7 wt % to 5 wt % of the electrode slurry composition for anodes (both calculated as solids).

The dispersing medium which may be any one selected from the group consisting of acetone, dimethyl formamide, N-methyl-2-2pyrrolidone, tetrahydrofuran, isopropanol, ethanol, methanol and water, and a mixture thereof. Water is preferred as dispersing medium. The amount of dispersing medium in the anode active material containing slurry ranges from 20% to 70%, preferably from 30% to 60% by weight.

Preferred is an electrode slurry composition for anodes comprising dispersing medium and

| | |
|---|---|
| 0.5 to 20% by weight | polymer P, |
| 50 to 98% by weight | anode active material, |
| 0.01 to 20% by weight | conductive material, |
| 0.5 to 20% by weight | co-binder |

based on 100% by weight solid content of the electrode slurry composition for anodes.

Also, in accordance with another aspect of the present disclosure, there is provided an anode, comprising a current collector; and an anode active material composition layer formed by coating, for example by slot die, dipping, reverse roll, direct roll, gravure, extrusion, doctor blade, immersion, brushing or dipping, the above-mentioned electrode slurry on one or both surface(s) of the current collector, followed by drying.

Non-limiting examples of the current collector may include foils obtained from copper, gold, nickel, aluminum, a copper-containing alloy, or a combination thereof.

The present invention also relates to the method of preparing an anode of secondary batteries comprising the steps of (a) combining the aqueous dispersion of polymer P, the anode active material, the conductive material, the co-binder and the dispersing medium to an electrode slurry composition
(b) providing a current collector
(c) coating the current collector with the electrode slurry composition
(d) drying the coated collector and
(e) optional molding the dried coated collector.

The drying may comprise a one or several drying steps conducted at a temperature range of 20 to 300° C., preferably at a temperature range of 50 to 150° C. The drying step causes the dispersing medium to be removed. It is usually dried until weight constancy is achieved.

Preferably the dried coated collector is molded. Molding is done according to a conventional method known in the art. Non-limiting examples for molding devices are calenders or pressing devices.

As used herein, the "molded collector" means a dried coated collector, which has been molded, having pores inside thereof. The molded collector preferably has a porosity of 10 to 60%. Because the expansion and contraction of the negative electrode active material during charge/discharge can be absorbed and reduced, whereby the negative electrode surely retains its shape. More preferably, the porosity is 30 to 50%. The porosity can be controlled by changing the conditions for producing the molded collector. When producing the molded collector by applying pressure onto the dried coated collector for example, the compression force can be adjusted to control the porosity. The porosity can be calculated using a volume $V_1$ determined from the size of resulting molded article and an absolute volume $V_0$ of the molded article, and represented by $\{(V_1-V_0)/V_1\}\times 100(\%)$.

The coating weight of the dried electrode slurry composition for anodes is in the range from 10 $g/m^2$ to 300 $g/m^2$ collector foil, preferably 25 $g/m^2$ to 200 $g/m^2$ collector foil.

The present invention also relates to an anode of secondary batteries which is formed by applying the electrode slurry composition for anodes onto a current collector and drying the negative electrode slurry composition. The present invention also relates to the lithium ion secondary battery comprising the anode of secondary batteries.

A cathode applied in the secondary battery is not particularly limited and may be manufactured by binding a cathode active material to a current collector according to a conventional method known in the art.

As a cathode active material, those that are commonly used in cathodes of secondary batteries may be used. Non-limiting examples of the cathode active material may include a lithium-manganese oxide, a lithium-cobalt oxide, a lithium-nickel oxide, a lithium-iron oxide, and a combination thereof. Also, non-limiting examples of the current collector for a cathode may include foils obtained from iron, aluminum, copper, nickel, or a combination thereof. Such cathode active materials are described, for example, in WO 2021/078626.

A separator which may be used in secondary battery includes any one which has been conventionally used in the art for example porous membranes or non-woven fabrics made of polyolefin-based polymer and are described, for example, in WO 2021/078626 page 10. The separator has preferably but is not limited to a thickness of 5 to 50 μm. Also, the separator has a pore size of 30-750 nm and a porosity of 10 to 95%, but is not particularly limited to.

In order to improve the mechanical strength of the separator and the safety of the secondary battery, a porous coating layer comprising inorganic particles and a polymer binder may be further formed on at least one surface of the separator. The inorganic particles are not particularly limited if they are electrochemically stable. That is, no oxidation-reduction reaction occurs in an operating voltage range of an applied secondary battery (e.g. 0 to 5V based on $Li/Li^+$).

Further, there is provided a secondary battery comprising a cathode, the anode according to the invention, a separator interposed between the cathode and the anode, and a non-aqueous electrolyte. In particular, among the secondary batteries, lithium secondary batteries including a lithium metal secondary battery, a lithium ion secondary battery, a lithium polymer secondary battery, or a lithium ion polymer secondary battery are preferred.

Assembling can be done by laminating, stacking or folding of a separator and an electrode, as well as a winding process. The resulting assembly is rolled or bent in accordance with the shape of a battery and put into a battery container, an electrolyte solution is injected into the battery container and the battery container is sealed up. Also, the secondary battery is not limited to its shape. For example, the shape of the battery may be like a coin, button or pouch, cylindrical, prismatic square or flat. Also, the secondary battery is not limited to its shape.

The electrolyte solution used in the present disclosure comprises a lithium salt as an electrolyte sat. The lithium salt may be any one which is conventionally used in an electrolyte solution for a lithium secondary battery. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

The electrolyte solution used in the present disclosure comprises an organic solvent which is conventionally used in an electrolyte solution for a lithium secondary battery. For example, solvents for electrolytes can be liquid or solid at room temperature and is preferably selected from cyclic or acyclic ethers, cyclic and acyclic acetals and cyclic or acyclic organic carbonates.

Additionally, the electrolyte solution may comprise thickeners like polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol. The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

(II)

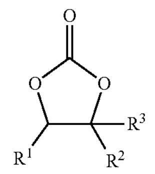

(III)

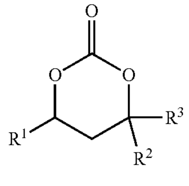

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

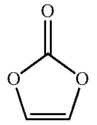

The solvent or solvents is/are preferably used in the water-free state, i.e. with a water content in the range from 1 ppm to 0.1% by weight, which can be determined, for example, by Karl-Fischer titration.

The polymer P according to the invention has a high adhesion to the surface of the anode active material, the solid electrolyte interface (SEI) which is formed on the anode active material during first charge and to the copper foil as collector alike. Additionally, polymer P—as a binder—keeps the adhesion between anode active material and the collector during charge/discharge cycles of a cell. Charging and discharging is done by intercalation and disintercalation of lithium causing volume expansion and shrinkage of the anode active material. This may weaken the adhesiveness of the polymer binder during repeated charging and discharging cycles thereby impairing the conductive structure of the electrochemical device. As a result, charging and discharging characteristics and life characteristics such as cell capacity are decreased.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one anode according to the invention. Preferably, in electrochemical cells according to the present invention, the majority of the electrochemical cells contains an anode according to the present invention. Even more preferably, in batteries according to the present invention all the electrochemical cells contain anodes according to the present invention.

The present invention further relates to the use of batteries according to the invention in appliances, in particular in mobile appliances. Examples of mobile appliances are vehicles, for example automobiles, bicycles, aircraft, or water vehicles such as boats or ships. Other examples of mobile appliances are those which move manually, for example computers, especially laptops, telephones, or electric hand tools, for example in the building sector, especially drills, battery-powered screwdrivers, or battery-powered staplers.

EXAMPLES

Unless the context indicates otherwise, percentages always signify weight percent. Contents reported relate to the content in an aqueous solution or dispersion. The indication pphm (parts per hundred parts monomers) denotes the proportion by weight based on 100 parts by weight of monomer.

Where water was used in the context of the examples, demineralized water was used.

Measurement Methods

Particle Size

Analytical Ultracentrifuge (AUC)

The size of the particles in the polymer dispersion and also the particle size distribution were determined using an analytical ultracentrifuge (AUC) with turbidity-based optical system and Mie correction for transmitted intensities per size. With turbidity detection, all components from 30 nm to 5 μm in diameter undergo measurement.

The method uses a homogeneous starting sedimentation. The method was carried out according to the guidelines of ISO 13318-1, with the specific set-up being described in W. Mächtle, L. Börger, "Analytical Ultracentrifugation of Polymers and Nanoparticles" chapter 3, Springer Science and Business Media, Berlin 2006. The evaluation starts from a spherical solid particle morphology of skeletal density which is dictated by the comonomer composition. The results are reported in volume metric in sphere-equivalent diameters.

For the measurement, the dispersions are diluted to a concentration of 4 g (solids)/liter with a 0.05 wt % aqueous surfactant solution and subjected to the measurement under the same conditions. The weight fraction of a particle population is obtained directly from the integral of the measurement.

Hydrodynamic Chromatography (HDC)

The size of the particles in the polymer dispersion and the particle size distribution were also determined using Hydrodynamic chromatography (HDC). HDC is a liquid chromatographic technique that separates analytes based on their size in solution. The measurements were carried out using a PL-PSDA particle size distribution analyzer (Polymer Laboratories, Inc.). A small amount of sample of the polymer latex was injected into an aqueous eluent containing an emulsifier, resulting in a concentration of approximately 0.5 g/l. The mixture was pumped through a glass capillary tube of approximately 15 mm diameter packed with polystyrene spheres. As determined by their hydrodynamic diameter, smaller particles can sterically access regions of slower flow in capillaries, such that on average the smaller particles experience slower elution flow. The fractionation was finally monitored using an UV-detector, which measured the extinction at a fixed wavelength of 254 nm.

Solids Content

Solids contents of the polymer dispersions were determined by distributing 0.5 to 1.5 g of the polymer dispersion in a metal lid with a diameter of 4 cm and then drying it in a forced-air drying cabinet at 140° C. for 30 minutes. The ratio of the mass of the sample after drying under the above conditions to the mass at sampling gives the solids content of the polymer dispersion.

Glass Transition Temperature $T_g$

The glass transition temperature is determined in accordance with DIN 53765 using a TA8000 series DSC820 instrument from Mettler-Toledo Int. Inc.

Starting materials used in the examples were as follows:

Emulsifier A: sodium lauryl sulfate as a 15 wt % solution (Disponil® SDS from BASF)

Emulsifier B: 45 wt % Sodium Dodecyl Diphenyl Oxide Disulfonate

Complexing agent: EDTA as a 2 wt % solution (Trilon® BX from BASF)

Seed latex: polystyrene seed in the form of a 29.7 wt % dispersion with a particle size of 30 nm (determined by analytical ultracentrifuge)

Initiator A: 7 wt % solution of sodium peroxodisulfate (NaPS)

Initiator B: 10 wt % solution of tert-butyl hydroperoxide

Reducing agent: 13 wt % solution of acetone bisulfite

Unless indicated otherwise, the water was deionized water. In all of the examples, the feeds were metered at a uniform volume flow rate.

Preparation of the Emulsion Polymers

The quantities below in pphm (parts per hundred parts monomer) are based on 100 parts by weight of total monomer.

Example 1—Binder 1

Initial Charge

| | |
|---|---|
| 339.56 g | of water |
| 14.48 g | of a 29.7 wt % dispersion of a polystyrene latex with a mean particle size of 30 nm (0.20 pphm) |
| 3.01 g | of acrylic acid (0.14 pphm) |
| 184.29 g | of a 7 wt % aqueous solution of itaconic acid (0.6 pphm) |
| 32.25 g | of a 2 wt % solution of EDTA (complexing agent) (0.03 pphm) |
| 2.15 g | of a 50 wt % solution of acrylamide (0.05 pphm) |
| 1.43 g | of a 15 wt % solution of sodium lauryl sulfate (emulsifier A) (0.01 pphm) |
| 4.30 g | of a 45 wt % sodium dodecyl diphenyl oxide disulfonate (emulsifier B) (0.09 pphm) |
| 43.00 g | of styrene (2.0 pphm) |
| 21.50 g | of butadiene (1.0 pphm) |

Addition 1

| | |
|---|---|
| 61.43 g | of a 7 wt % solution of sodium peroxodisulfate (Initiator A) (0.20 pphm) |

Feed 1

| Feed 1: | |
|---|---|
| 55.04 g | of a 50 wt % solution of acrylamide (1.28 pphm) |
| 34.40 g | of a 15 wt % solution of sodium lauryl sulfate (0.24 pphm) |
| 24.84 g | of a 45 wt % sodium dodecyl diphenyl oxide disulfonate (emulsifier B) (0.52 pphm) |
| 35.83 g | of 15 wt % sodium hydroxide solution (0.25 pphm) |
| 715.72 ml | water |

Feed 2

| | |
|---|---|
| 71.81 g | of acrylic acid (3.34 pphm) |
| 1070.27 g | of styrene (49.78 pphm) |
| 107.5 g | of acrylonitrile (5.0 pphm) |
| 8.60 g | of tert-dodecylmercaptane (0.4 pphm) |

Feed 3

| | |
|---|---|
| 791.42 g | of butadiene (36.81 pphm) |

Feed 4

| | |
|---|---|
| 251.86 g | of a 7 wt % solution of sodium peroxodisulfate (0.82 pphm) |

Feed 5

| | |
|---|---|
| 75.25 g | of a 10 wt % solution of tert-butyl hydroperoxide (initiator B) (0.35 pphm) |

Feed 6

| | |
|---|---|
| 80.82 g | of a 13.1 wt % solution of acetone bisulfite (0.53 pphm) |

Feed 7

| | |
|---|---|
| 104.63 g | of 15 wt % sodium hydroxide solution (0.73 pphm) |

The components of the initial charge were charged to a 6 l pressure reactor and mixed. The initial charge was heated to 85° C. When 85° C. were reached, the initiator A (addition 1) was added over 5 minutes and the polymerization commenced. The mixture was stirred for another 5 minutes.

Started immediately thereafter were feeds 1, 2, 3 and 4 (time: 0 minutes) and the temperature was continuously decreased to 80° C. over a period of 20 minutes. Feeds 1, 2 and 4 took place over a period of 6 hours. Feed 3 took place over a period of 5 hours and 30 minutes.

After the end of the metered addition of feeds 1, 2 and 4, the polymerization mixture was stirred for a further 30 minutes. Thereafter 308.1 ml of water (14.33 pphm) were added.

Feeds 5 and 6 were started subsequently and took place over a period of 90 minutes. Feed 7 started 15 min before the end of the feed 5 and 6 and took place over a period of 15 minutes. After the end of feeds 5, 6 and 7 the polymerization mixture was cooled to room temperature.

The solids content of the dispersion was 50.5 wt %. The dispersion polymer had a glass transition temperature $T_g$ of 7.2° C.

The polymer dispersion was analyzed using HDC:

Particle size distribution: Peak-Maximum at 268 nm with tailing.

Examples 2—10 Binder 2-10

In analogy to example 1, further dispersions were prepared with the monomer compositions given in table 1.

Example 2—Binder 2 (Not According to the Invention)

The emulsion polymerization was carried out as in inventive example 1, with the difference that the feed 2 did not contain acrylonitrile and instead the styrene content in feed 2 was increased.

The solids content of the dispersion was 50.5 wt %. The dispersion polymer had a glass transition temperature $T_g$ of 2° C.

The polymer dispersion was analyzed using HDC:

Bimodal Particle Size Distribution:

The particle population of the "smaller" particles had its peak maximum at 271 nm. The fraction as a proportion of the total polymer was 96 wt %.

The particle population of the "larger" particles had its peak maximum at 468 nm. The fraction as a proportion of the total polymer was 4 wt %.

Example 4—Binder 4 (According to the Invention)

The emulsion polymerization was carried out as in inventive example 1, with the difference that the feed 1 did contain 143.33 g of a 15 wt % solution of N-methylolmethacrylamide (1.0 pphm) and instead the styrene content in feed 2 was decreased. Furthermore, the amount of water in feed 1 was reduced to 593.89 ml.

The solids content of the dispersion was 50.5 wt %. The dispersion polymer had a glass transition temperature $T_g$ of 6.6° C.

The polymer dispersion was analyzed using HDC:

Bimodal particle size distribution:

The particle population of the "smaller" particles had its peak maximum at 265 nm. The fraction as a proportion of the total polymer was 80 wt %.

The particle population of the "larger" particles had its peak maximum at 484 nm. The fraction as a proportion of the total polymer was 20 wt %.

Example 6—Binder 6 (According to the Invention)

The emulsion polymerization was carried out as in inventive example 1, with the difference that the feed 1 did contain 430.00 g of a 15 wt % solution of N-methylolmethacrylamide (3.0 pphm) and instead the styrene content in feed 2 was about 1.5 pphm decreased and the butadiene content was about 1.5 pphm decreased. Furthermore, the amount of water in feed 1 was reduced to 350.22 ml ml.

The solids content of the dispersion was 50.5 wt %. The dispersion polymer had a glass transition temperature $T_g$ of 10° C.

The polymer dispersion was analyzed using an analytical ultracentrifuge:

Bimodal Particle Size Distribution:

The particle population of the "smaller" particles had its peak maximum at 260 nm. The fraction as a proportion of the total polymer was 50 wt %.

The particle population of the "larger" particles had its peak maximum at 490 nm. The fraction as a proportion of the total polymer was 50 wt %.

Example 7—Binder 7 (According to the Invention)

It was polymerized analogously to Example 1 with the difference that the polymerization took place at 90° C. The solids content of the dispersion was 50.5 wt %. The dispersion polymer had a glass transition temperature $T_g$ of 13.5° C.

The polymer dispersion was analyzed using HDC:

Particle size distribution: Peak-Maximum at 215 nm with tailing.

Example 8—Binder 8 (According to the Invention)

It was polymerized analogously to Example 1 with the difference that the polymerization took place at 95° C.

The solids content of the dispersion was 50.5 wt %. The dispersion polymer had a glass transition temperature $T_g$ of 15.7° C.

The polymer dispersion was analyzed using HDC:

Particle size distribution: Peak-Maximum at 188 nm with tailing.

Example 9—Binder 9 (According to the Invention)

The emulsion polymerization was carried out as in inventive example 1, with the difference that the feed 1 did contain 71.67 g of a 15 wt % solution of N-methylolmethacrylamide (0.5 pphm) and instead the styrene content in feed 2 was decreased. Furthermore, the amount of water in feed 1 was reduced to 660.60 ml.

The solids content of the dispersion was 50.5 wt %. The dispersion polymer had a glass transition temperature $T_g$ of 8.4° C.

The polymer dispersion was analyzed using HDC:

Particle size distribution: Peak-Maximum at 240 nm with tailing.

Example 10—Binder 10 (According to the Invention)

The emulsion polymerization was carried out as in inventive example 1, with the difference that the feed 1 did contain 215 g of a 15 wt % solution of N-methylolmethacrylamide (1.5 pphm) and instead the styrene content in feed 2 was decreased. Furthermore, the amount of water in feed 1 was reduced to 538.77 ml ml.

The solids content of the dispersion was 50.5 wt %. The dispersion polymer had a glass transition temperature $T_g$ of 7.4° C.

The polymer dispersion was analyzed using HDC:

Bimodal Particle Size Distribution:

The particle population of the "smaller" particles had its peak maximum at 281 nm. The fraction as a proportion of the total polymer was 88 wt %.

The particle population of the "larger" particles had its peak maximum at 435 nm. The fraction as a proportion of the total polymer was 12 wt %.

Example 12—Binder 12 (Not According to the Invention)

The emulsion polymerization was carried out as in inventive example 1, with the difference that the polymer composition and the amount of free-radical chain transfer agent is identical with the polymer composition and free-radical chain transfer agent amount from Example 1 from EP 2869372:61.91 pphm Styrene, 33.33 pphm Butadiene, 3.81 pphm Itaconic acid, 0.95 pphm 2-Hydroxy ethylacrylate and 0.3 pphm tert-dodecylmercaptane.

Initial Charge

| | |
|---|---|
| 310.38 g | of water |
| 13.47 g | of a 29.7 wt % dispersion of a polystyrene latex with a mean particle size of 30 nm (0.20 pphm) |
| 30.00 g | of a 2 wt % solution of EDTA (complexing agent) (0.03 pphm) |
| 1.33 g | of a 15 wt % solution of sodium lauryl sulfate (emulsifier A) (0.01 pphm) |
| 4.00 g | of a 45 wt % sodium dodecyl diphenyl oxide disulfonate (emulsifier B) (0.09 pphm) |
| 40.00 g | of styrene (2.0 pphm) |
| 20.50 g | of butadiene (1.0 pphm) |

Addition 1

| | |
|---|---|
| 57.14 g | of a 7 wt % solution of sodium peroxodisulfate (Initiator A) (0.20 pphm) |

Feed 1

| | |
|---|---|
| 32.00 g | of a 15 wt % solution of sodium lauryl sulfate (0.24 pphm) |
| 23.11 g | of a 45 wt % sodium dodecyl diphenyl oxide disulfonate (emulsifier B) (0.52 pphm) |
| 33.33 g | of 15 wt % sodium hydroxide solution (0.25 pphm) |
| 1088.57 g | of a 7 wt % aqueous solution of itaconic acid (3.81 pphm) |

Feed 2

| | |
|---|---|
| 71.81 g | of 2-Hydroxyethyl acrylate (0.95 pphm) |
| 1198.16 g | of styrene (59.91 pphm) |
| 6.00 g | of tert-dodecylmercaptane (0.3 pphm) |

Feed 3

| | |
|---|---|
| 646.6 g | of butadiene (32.33 pphm) |

Feed 4

| | |
|---|---|
| 234.29 g | of a 7 wt % solution of sodium peroxodisulfate (0.82 pphm) |

Feed 5

| | |
|---|---|
| 70.00 g | of a 10 wt % solution of tert-butyl hydroperoxide (initiator B) (0.35 pphm) |

Feed 6

| | |
|---|---|
| 75.18 g | of a 13.1 wt % solution of acetone bisulfite (0.53 pphm) |

Feed 7

| | |
|---|---|
| 97.33 g | of 15 wt % sodium hydroxide solution (0.73 pphm) |

The components of the initial charge were charged to a 6 l pressure reactor and mixed. The initial charge was heated to 85° C. When 85° C. were reached, the initiator A (addition 1) was added over 5 minutes and the polymerization commenced. The mixture was stirred for another 5 minutes.

Started immediately thereafter were feeds 1, 2, 3 and 4 (time: 0 minutes) and the temperature was continuously decreased to 80° C. over a period of 20 minutes. Feeds 1, 2 and 4 took place over a period of 6 hours. Feed 3 took place over a period of 5 hours and 30 minutes.

After the end of the metered addition of feeds 1, 2 and 4, the polymerization mixture was stirred for a further 30 minutes. Thereafter 287 ml of water (14.33 pphm) were added.

Feeds 5 and 6 were started subsequently and took place over a period of 90 minutes. Feed 7 started 15 min before the end of the feed 5 and 6 and took place over a period of 15 minutes. After the end of feeds 5, 6 and 7 the polymerization mixture was cooled to room temperature.

The solids content of the dispersion was 48.5 wt %. The dispersion polymer had a glass transition temperature $T_g$ of 9° C.

The polymer dispersion was analyzed using HDC:

Particle size distribution: Peak-Maximum at 217 nm showing a shoulder in the lower nm range.

Example 13—Binder 13 (Not According to the Invention)

The emulsion polymerization was carried out as in comparative example 1, with the difference that the feed 2 contains 100 g of acrylonitrile (5 pphm) and instead the styrene content in feed 2 was decreased.

The solids content of the dispersion was 48.5 wt %. The dispersion polymer had a glass transition temperature $T_g$ of 15° C.

The polymer dispersion was analyzed using HDC:

Particle size distribution: Peak-Maximum at 199 nm showing a shoulder in the lower nm range.

TABLE 1

Monomer compositions of the binder B1-B13 (not according to the invention are B2, B12 and B13)

| | Monomers [wt %] | | | | | | | | | |
|---|---|---|---|---|---|---|---|---|---|---|
| | B 1 | B 2 | B 4 | B 6 | B 7 | B 8 | B 9 | B 10 | B12 | B 13 |
| styrene | 51.78 | 56.78 | 50.78 | 50.28 | 51.78 | 51.78 | 51.28 | 50.28 | 61.91 | 56.91 |
| butadiene | 37.81 | 37.81 | 37.81 | 36.31 | 37.81 | 37.81 | 37.81 | 37.81 | 33.33 | 33.33 |
| AS | 3.48 | 3.48 | 3.48 | 3.48 | 3.48 | 3.48 | 3.48 | 3.48 | 0 | 0 |
| Itaconic acid | 0.6 | 0.6 | 0.6 | 0.6 | 0.6 | 0.6 | 0.6 | 0.6 | 3.81 | 3.81 |
| acrylonitrile | 5 | 0 | 5 | 5 | 5 | 5 | 5 | 5 | 0 | 5 |
| acryl amide | 1.33 | 1.33 | 1.33 | 1.33 | 1.33 | 1.33 | 1.33 | 1.33 | 0 | 0 |
| Mamol | 0 | 0 | 1 | 3 | 0 | 0 | 0.5 | 1.5 | 0 | 0 |
| HEA | | | | | | | | | 0.95 | 0.95 |

B2, B12 and B13 are not according to the invention
AS: acrylic acid
Mamol: N-methylolmethacrylamide
HEA—Hydroxyethyl acrylate

Production of Polymer Films

Films with a theoretical thickness of 0.5 mm were produced by pouring the dispersion into a silicone mold. The films were dried and peeled off at room temperature for 18 hours. The extracted films were dried at 60° C. in a drying oven for 2 hours. The films were then stored for 2 hours at 40° C. and 2 hours at 70° C.

For electrolyte soaking, films with a theoretical thickness of 0.5 mm were produced by pouring the dispersion into a silicone mold. The films were dried and peeled off at room temperature for 18 hours. The extracted films were dried at 60° C. in a drying oven for 2 hours. The films were then stored for 2 hours at 40° C. and 2 hours at 70° C. and finally for 3 days in LP57 electrolyte (1 M LiPF6 ethylene carbonate: ethyl methyl carbonate, 3:7) at 70° C.

Mechanical Characterization of the Polymer Films

Breaking Stress and Elongation at Break (Stress/Strain Measurement)

The polymer films were characterized in a quasi-static tensile test up to polymer failure.

Preparation of the sample: From the polymer films obtained, test specimens were produced by means of a punching process. For punching, a shoulder rod shape is used for a test specimen geometry with a length of 75 mm according to DIN 53504. Dumbbell shape of size 75 mm×4 mm used (according to DIN 54504S2). The thickness of the test specimen results from the average value of 3 measurements. After that, the test specimens were tested in the climate chamber at 23° C. and 50% rel. air humidity stored for 15 hours.

Execution of the Test

The tensile test was carried out on a Zwick Type 110846 testing machine. The test specimen was clamped into the machine in such a way that the test track is 40 mm. The pull-off speed is 200 mm/min. The values for the stress and strain are output by the testing machine.

TABLE 2

Values of stress/strain measurement of the pure polymer dispersion films after storage for 2 hrs at 40° C. then 2 hrs. 70° C.; additional electrolyte soaking is done by storage for 2 hrs at 40° C., 2 hrs. 70° C. and then 3 days in LP57 electrolyte (1M LiPF6 ethylene carbonate:ethyl methyl carbonate, 3:7) at 70° C.

| Binder | Stress [N/mm$^2$] | Strain [%] | Stress [N/mm$^2$] after electrolyte soaking | Strain [%] after electrolyte soaking |
|---|---|---|---|---|
| B1 | 16 | 340 | 10.3 (64% ret.) | 513 |
| B12 | 15.7 | 503 | 10.2 (65% ret.) | 561 |
| B13 | 19.3 | 260 | 7.5 (40% ret.) | 290 |
| B2 | 8 | 280 | 7.0 (57% ret.) | 221 |
| B4 | 12.7 | 594 | 8.3 (65% ret.) | 548 |
| B6 | 15.9 | 436 | 14.4 (90% ret.) | 340 |

ret.: retention;
DEC: diethyl carbonate

Good stress levels are ≥8 N/mm$^2$

Good strain values are ≥300%

Good strain values according to electrolyte soaking: ≥200%

Good stress values after electrolyte soaking show a retention of at least 60% of initial value.

The binder polymers according the invention show a good stress/strain behavior. They keep a high stress value even after electrolyte soaking.

Production of Anode Slurry

Components Used

| | |
|---|---|
| Texturecell ™ 2000 PA 07 | granular Carboxy-Methyl-Cellulose (CMC) of the company IFF (mean molecular weight 450-500k mol/g, viscosity 2000 mPas of a 2% aqueous solution and a degree of substitution of 0.7) |
| Carbon black Timcal Super C65 | of the company Imerys (BET = 62 m$^2$/g) |
| synthetic graphite SMG A5 | of the company Showa Denko (particle size D10 = 7.6 μm, D50 = 18.5 μm, D90 = 33.5 μm, BET von 3.0 m$^2$/g, |
| Silicon suboxide KSC 1265 | of the company Shin-Etsu (Japan) (non lithium doped SiOx type particle size D10 = 4.1 μm, D50 = 6.5 μm, D90 = 9.3 μm |

A 2 wt.-% aqueous solution of carboxy-methyl cellulose was prepared and stored for 24 hours.

For the preparation of the anode slurry, this 2 wt.-% carboxymethylcellulose solution was provided, degassed several times while applying a light vacuum (300 mbar) and stirred for 30 minutes at 2000 rpm with a dissolve stirrer. Subsequently, the soot was dosed, again a slight vacuum was applied (300 mbar) and dispersed at a speed of 3500 rpm. Subsequently, first 4 servings of graphite and then 4 servings of SiOx were dosed. After dosing the solid, a light vacuum (300 mbar) was dispersed (speed 3500 rpm). Then the polymer dispersion of the respective example was stirred in for 10 minutes at 500 rpm and then stirred for 10 minutes at 150 rpm during the degassing process (at a vacuum of 300 mbar). Finally, the solids content is set to a value in the range of 48-50%.

TABLE 3 slurry composition

| components | parts (wt %) solid |
|---|---|
| Graphit Hitachi SMG A5 | 83.5 |
| SiOx Shin-Etsu KSC1265 | 9.5 |
| Conductive additive Carbon Black - Super C65 (Imerys) | 1.3 |
| CMC (CRT 2.000 PA 07 (2,0% solution) IFF) | 1.7 |
| Binder | 4 |

Preparation of a Silicon-Containing Anode According to the Invention

The respective anode slurry was applied with a doctor blade with a gap dimension of 250 μm on one piece (250 mm×150 mm) copper sheet (manufacturer, thickness: 10 μm). Then the coated anode was dried for 2 minutes at 60° C. and 1 minute at 120° C. Subsequently, the coated copper sheets were calendered to a density of 1.45 g/$cm^3$ (target density).

Finally, the coated copper sheets were stored for 24 hours in a climatic chamber at 23° C. and 50% humidity and then mechanically characterized.

Mechanical Characterization of the Silicon-Containing Anode by Means of a 90° Peel Test Preparation of the Test Specimen Coated copper sheets were cut into 25 mm wide and 150 mm long strips. An HDPE test specimen (20×3 $cm^2$) was used as the carrier material. A double-sided adhesive tape was applied to the carrier material. A coated anode strip was placed on the adhesive strip with the coated side and pressed with a rubber roller (powerless) bubble-free. Subsequently, the layers were joined together in a defined way by rolling a 2 kg hand roller twice without force over the composite. The test specimen produced in this way was stored in the climate chamber for 24 hours at 23° C. and 50% humidity.

The test is carried out on a Zwick tearing machine.

Test Parameters

Device: Zwick tearing machine
Trigger angle: 90°
Measuring speed: 50 mm/min
Preload: 0.1 N
Clamping length: 20 mm
Measuring distance: 60 mm
Valuation: 10-50 mm
Evaluation N/m

TABLE 4

Peelstrength values of the slurry coating.

| Slurry coating Example | Binder | Peelstrength [N/m] | |
|---|---|---|---|
| 1 | B1 | 17.5 | |
| 12 | B12 | 13.7 | not according to the invention |
| 13 | B13 | 11.7 | not according to the invention |
| 2 | B2 | 9.6 | not according to the invention |
| 4 | B4 | 17 | |
| 6 | B6 | 15.6 | |
| 7 | B7 | 16.4 | |
| 8 | B8 | 15.0 | |
| 9 | B9 | 21.4 | |

Coatings with binders according to the invention have a peelstrength ≥15 N/m.

The invention claimed is:

1. A method for producing an aqueous dispersion of a polymer P by radically initiated emulsion polymerization, the method comprising: polymerizing

| | | |
|---|---|---|
| (a) | 40 to 75 parts by weight of | at least one vinylaromatic compound, |
| (b) | 22.5 to 55 parts by weight of | at least one conjugated aliphatic diene, |
| (c) | 0.5 to 10 parts by weight of | at least one ethylenically unsaturated monomer containing acid groups |
| (d1) | 1 to 5 parts by weight of | acrylamide and/or methacrylamide, |
| (d2) | 1 to 10 parts by weight of | acrylonitrile and/or methacrylonitrile |
| (e) | 0 to 5 parts by weight of | monoethylenically unsaturated monomer having at least one epoxy, hydroxyl, N-methylol or carbonyl group, and |
| (f) | 0 to 20 parts by weight of | at least one other monoethylenically unsaturated monomer, |

wherein the polymerization temperature is in the range of 70 to 95° C.

2. The method according to claim 1, wherein monomer (e) is selected from the group comprising N-methylolacrylamide and N-methylolmethacrylamide.

3. The method according to claim 1, wherein the polymer P is produced by polymerizing

| | | |
|---|---|---|
| (a) | 45 to 68.9 parts by weight of | at least one vinylaromatic compound |
| (b) | 28 to 50 parts by weight of | at least one conjugated aliphatic diene |
| (c) | 1 to 8 parts by weight of | at least one ethylenically unsaturated carboxylic acids |
| (d1) | 1 to 3 parts by weight of | acrylamide |
| (d2) | 1 to 8 parts by weight of | acrylonitrile |
| (e) | 0.1 to 4 parts by weight of | monoethylenically unsaturated monomer having at least one N-methylol group, and |
| (f) | 0 to 15 parts by weight of | at least one other monoethylenically unsaturated monomer. |

4. The method according to claim 1, wherein the polymerization temperature is in the range of 75 to 90° C.

5. The method according to claim 1, wherein the radically initiated emulsion polymerization takes place in the presence of a seed latex.

6. The method according to claim 1, wherein the radically initiated emulsion polymerization takes place in the presence of ≤1 parts by weight of free-radical chain transfer agent, based on 100 parts by weight of total monomers.

7. The method according to claim 1, wherein the polymer P has a breaking stress of at least 8 $N/mm^2$ and the strain is at least 150%.

8. An electrode slurry composition for anodes, comprising the polymer P produced according to claim 1, an anode active material, a conductive material, a co-binder, and a dispersing medium.

9. The electrode slurry composition for anodes of claim 8, comprising a dispersing medium and

| | |
|---|---|
| 0.5 to 20% by weight | of polymer P, |
| 50 to 98% by weight | of anode active material, |
| 0.01 to 20% by weight | of conductive material, and |
| 0.5 to 20% by weight | of co-binder |

based on 100% by weight solid content of the electrode slurry composition for anodes.

10. A method for producing an anode of secondary batteries, the method comprising:
(a) applying the electrode slurry composition for anodes according to claim 8 onto a current collector, and
(b) drying the negative electrode slurry composition.

11. A lithium ion secondary battery comprising the anode of secondary batteries of claim 10.

12. A method for preparing an anode of secondary batteries, the method comprising:
(a) combining the aqueous dispersion of polymer P of claim 1, an anode active material, a conductive material, a co-binder, and a dispersing medium to form an electrode slurry composition;
(b) providing a current collector;
(c) coating the current collector with the electrode slurry composition;
(d) drying the coated collector; and
(e) optionally molding the coated collector.

13. The method according to claim 1, wherein polymer P is produced by radically initiated aqueous emulsion polymerization, the method comprising: polymerizing

| | | |
|---|---|---|
| (a) | 40 to 75 parts by weight of | at least one vinylaromatic compound, |
| (b) | 22.5 to 55 parts by weight of | at least one conjugated aliphatic diene, |
| (c) | 0.5 to 10 parts by weight of | at least one ethylenically unsaturated monomer containing acid groups |
| (d1) | 1 to 5 parts by weight of | acrylamide and/or methacrylamide, |
| (d2) | 1 to 10 parts by weight of | acrylonitrile and/or methacrylonitrile |
| (e) | 0 to 5 parts by weight of | monoethylenically unsaturated monomer having at least one epoxy, hydroxyl, N-methylol or carbonyl group |
| (f) | 0 to 20 parts by weight of | at least one other monoethylenically unsaturated monomer, |

wherein the polymerization temperature is in the range of 70 to 95° C.

* * * * *